Apr. 10, 1923.
W. R. MYERS
1,451,431
APPARATUS FOR POSITIONING MATERIALS
Original Filed Mar. 28, 1921   9 sheets-sheet 1
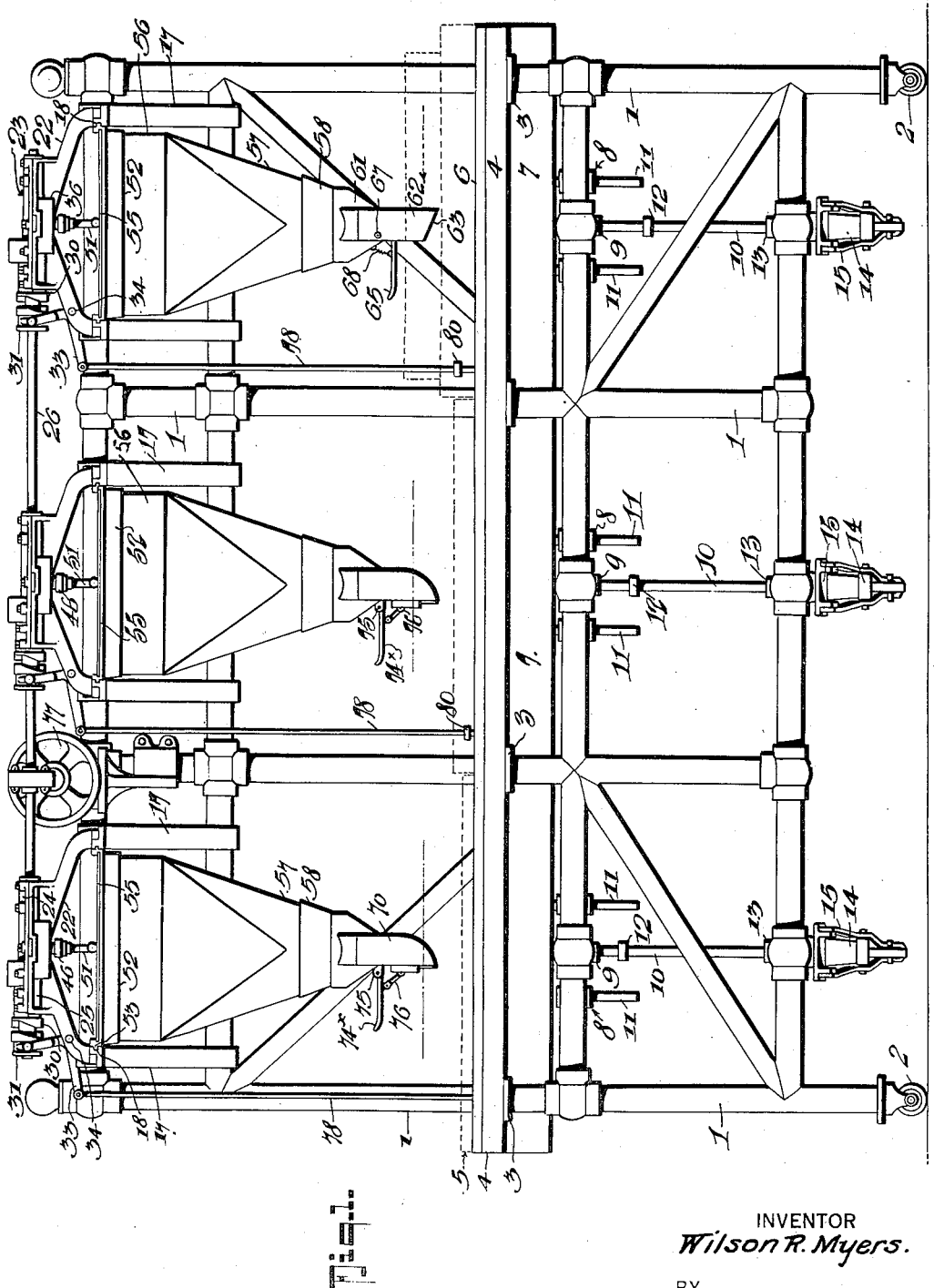
INVENTOR
*Wilson R. Myers.*
BY
*Fred G. Dieterich*
ATTORNEYS Apr. 10, 1923.
W. R. MYERS
1,451,431
APPARATUS FOR POSITIONING MATERIALS
Original Filed Mar. 28, 1921   9 sheets-sheet 2
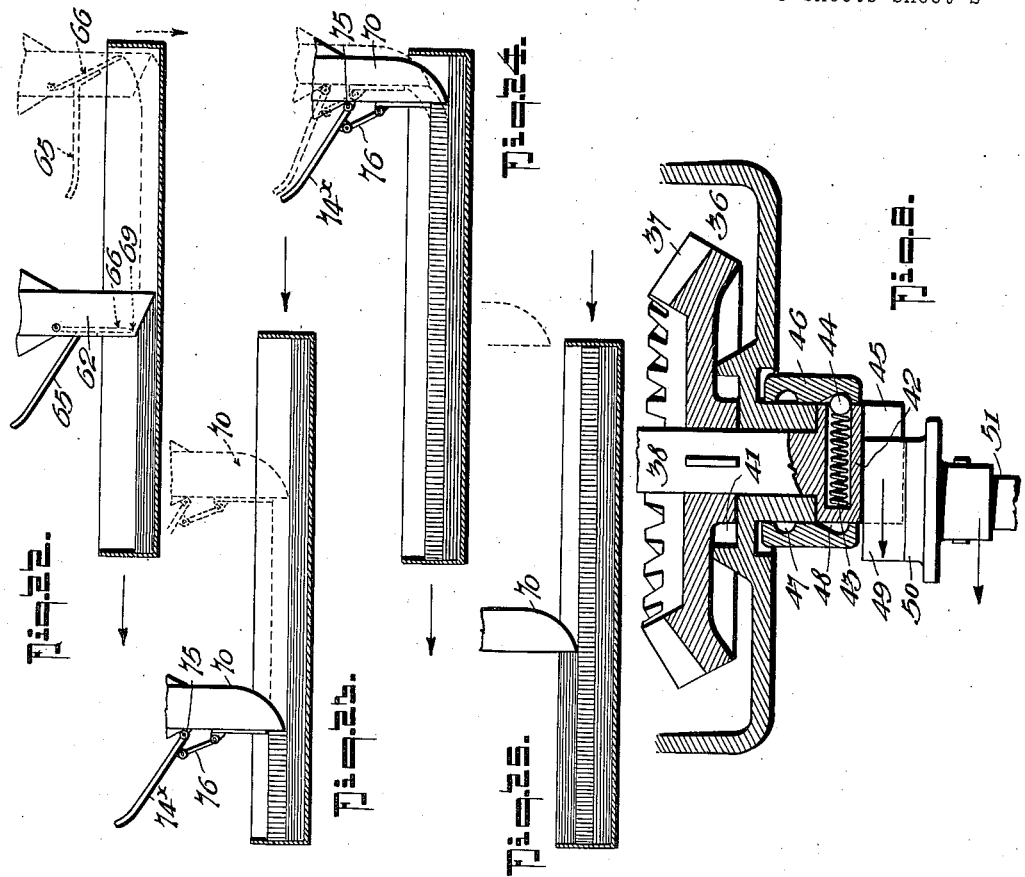
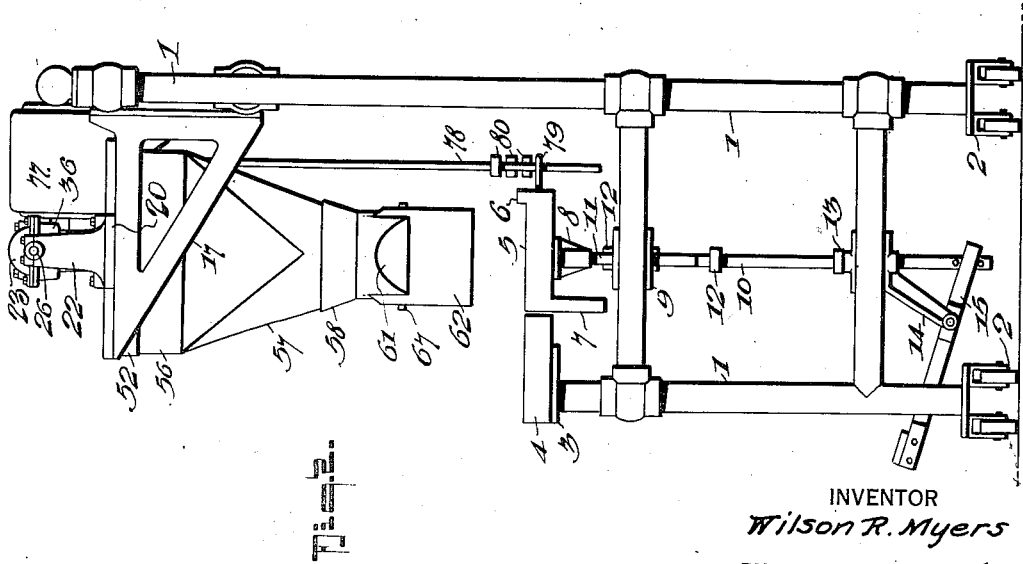
INVENTOR
Wilson R. Myers
BY
Fred G. Dieterich
ATTORNEYS Apr. 10, 1923.
W. R. MYERS
APPARATUS FOR POSITIONING MATERIALS
Original Filed Mar. 28, 1921
1,451,431
9 sheets-sheet 3
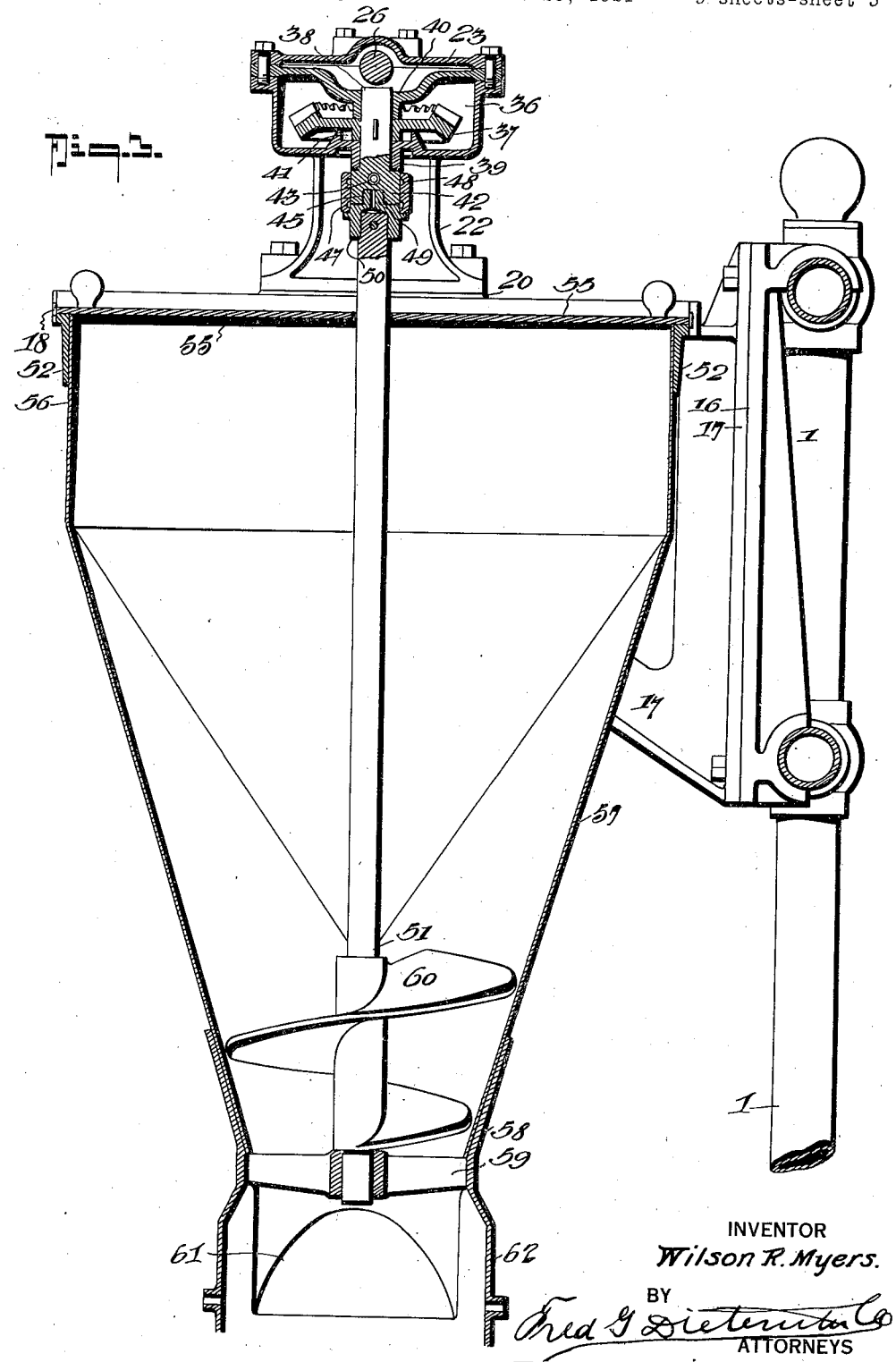
INVENTOR
Wilson R. Myers.
BY
Fred G. Dieterich Co
ATTORNEYS

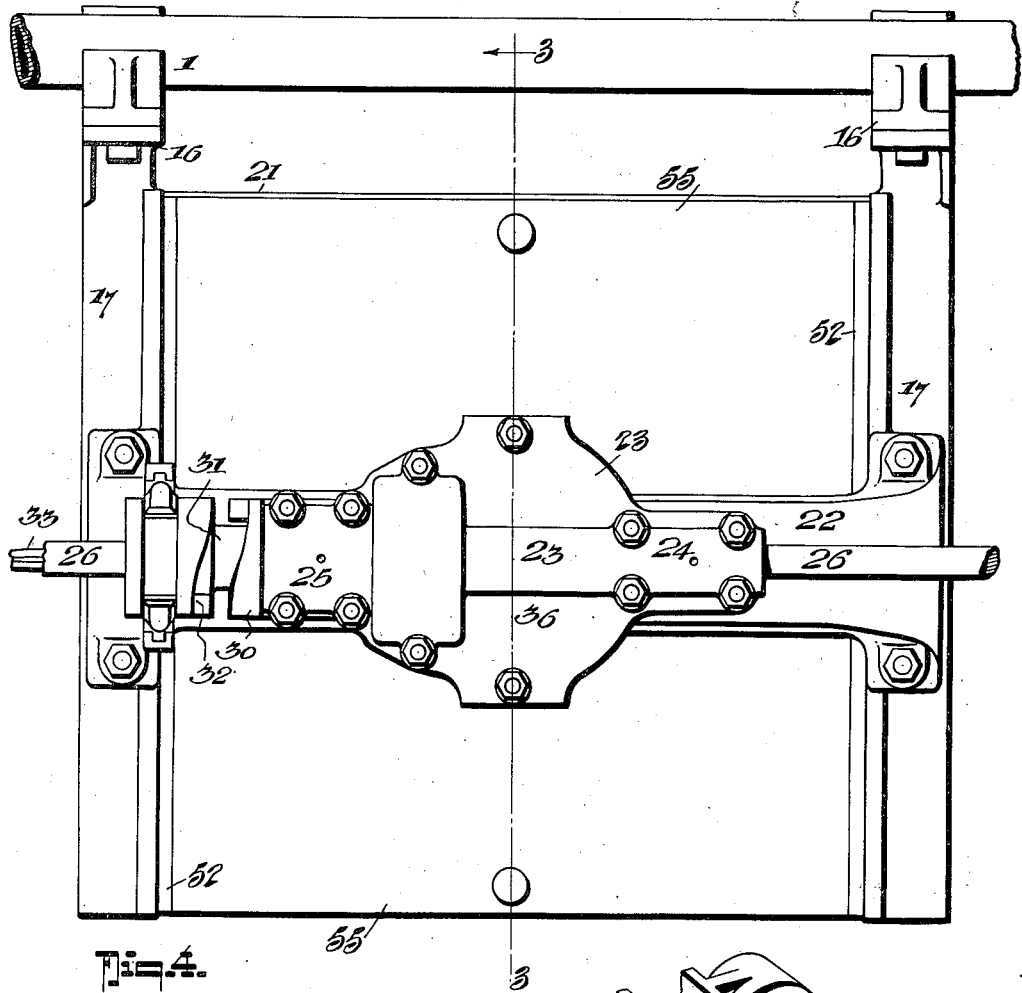

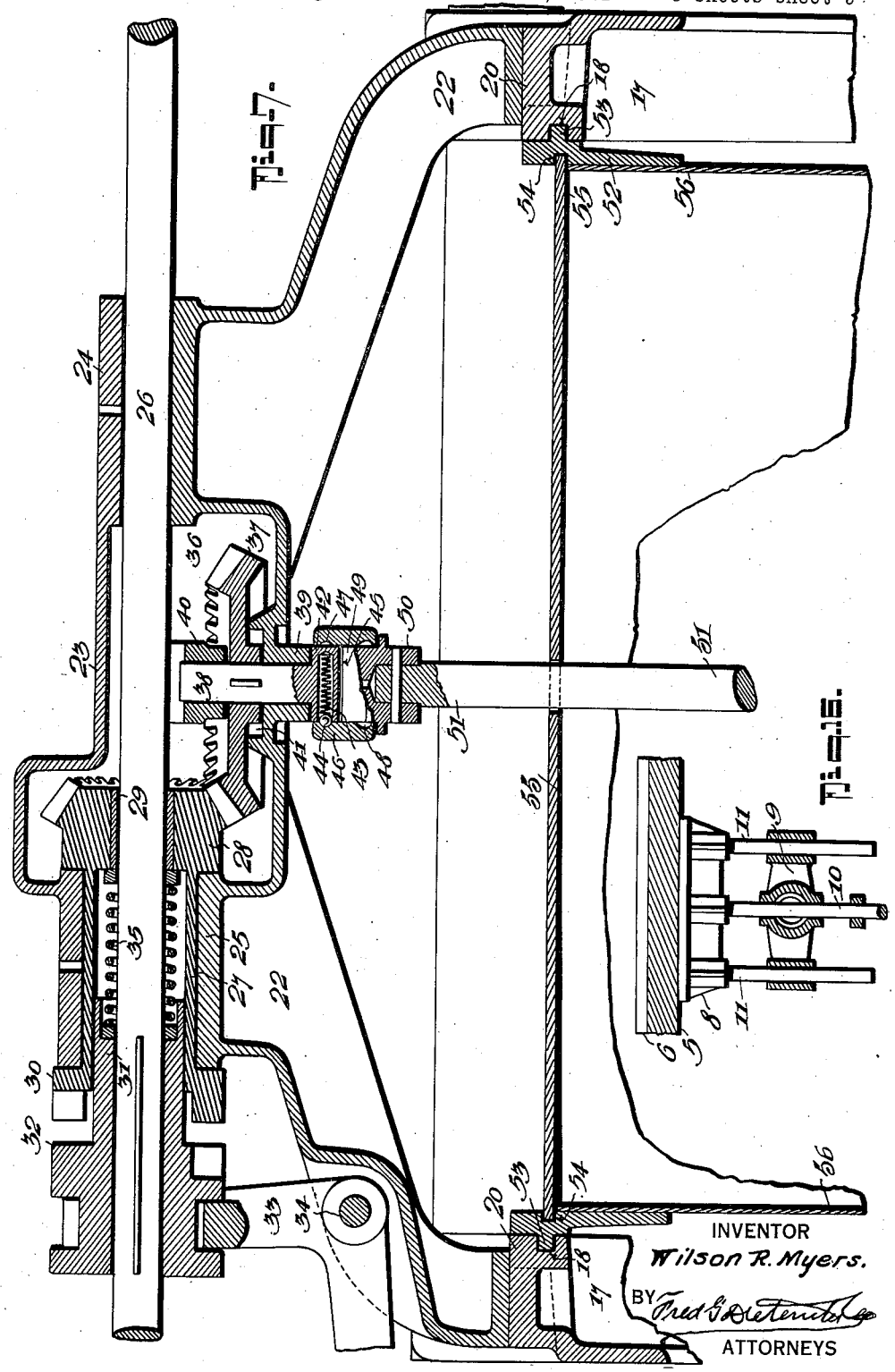

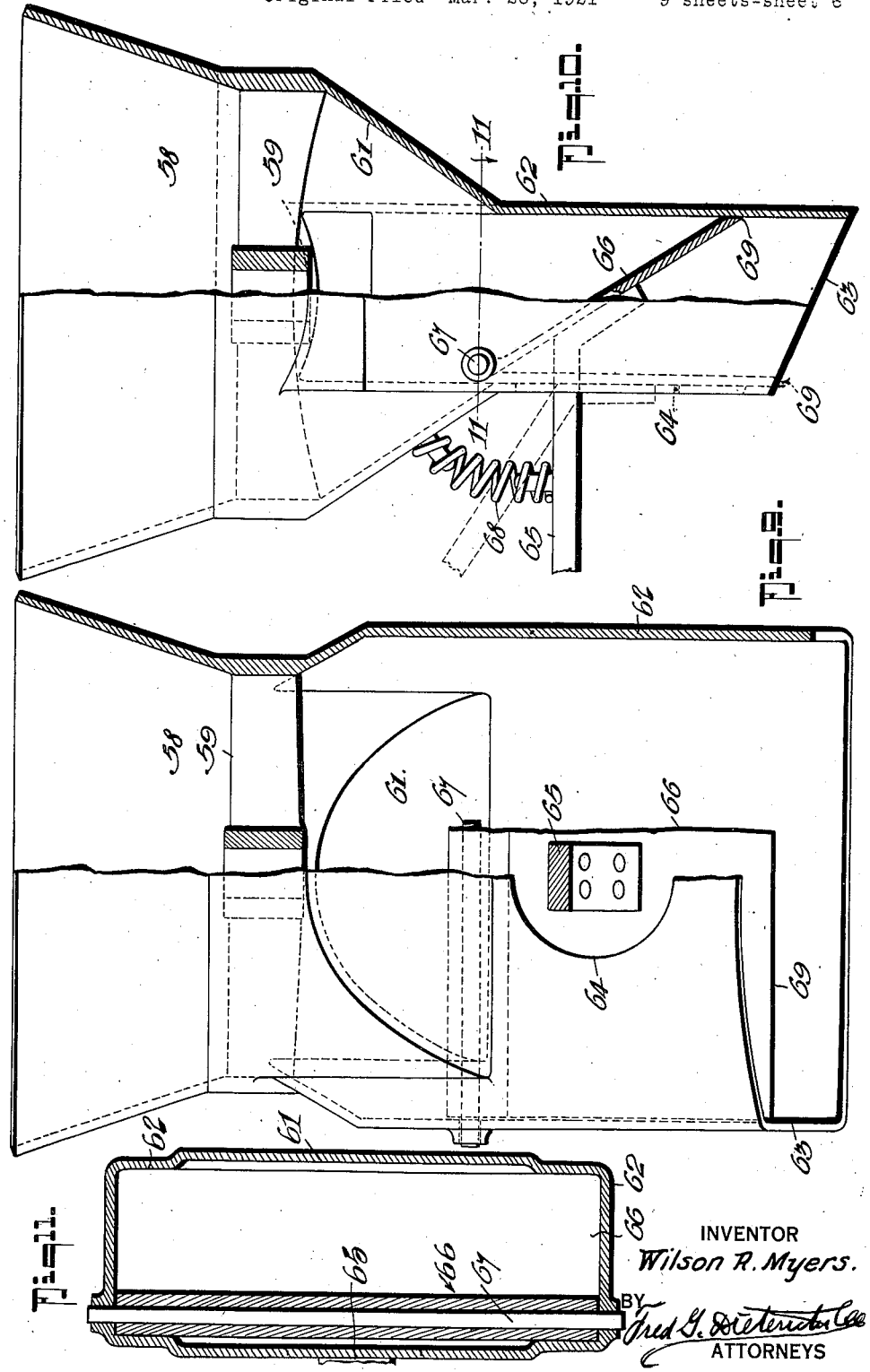

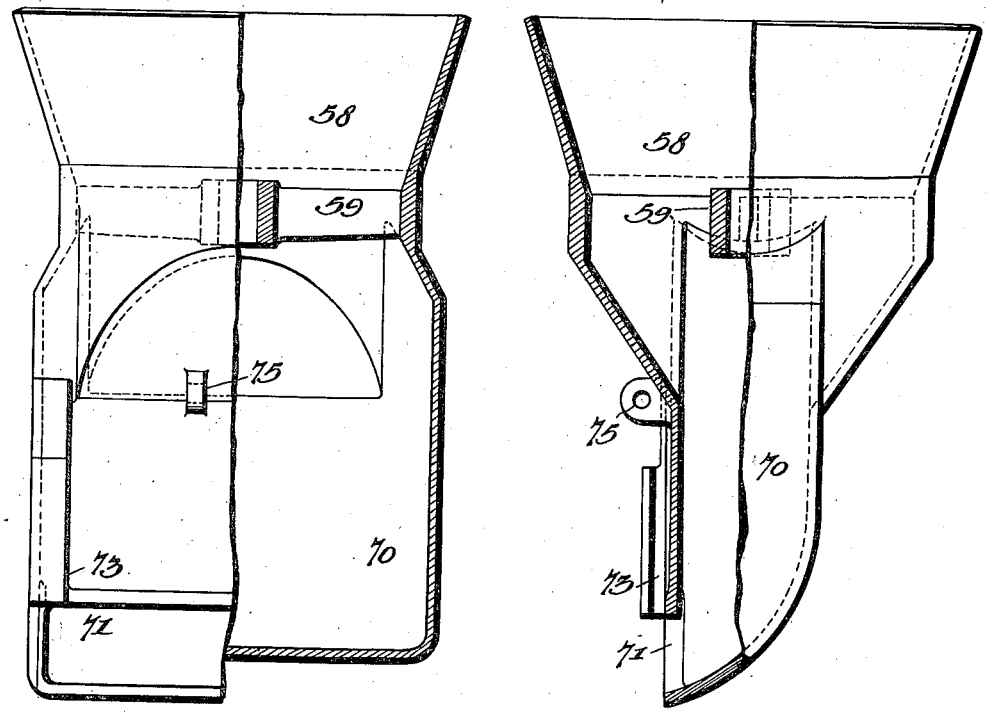
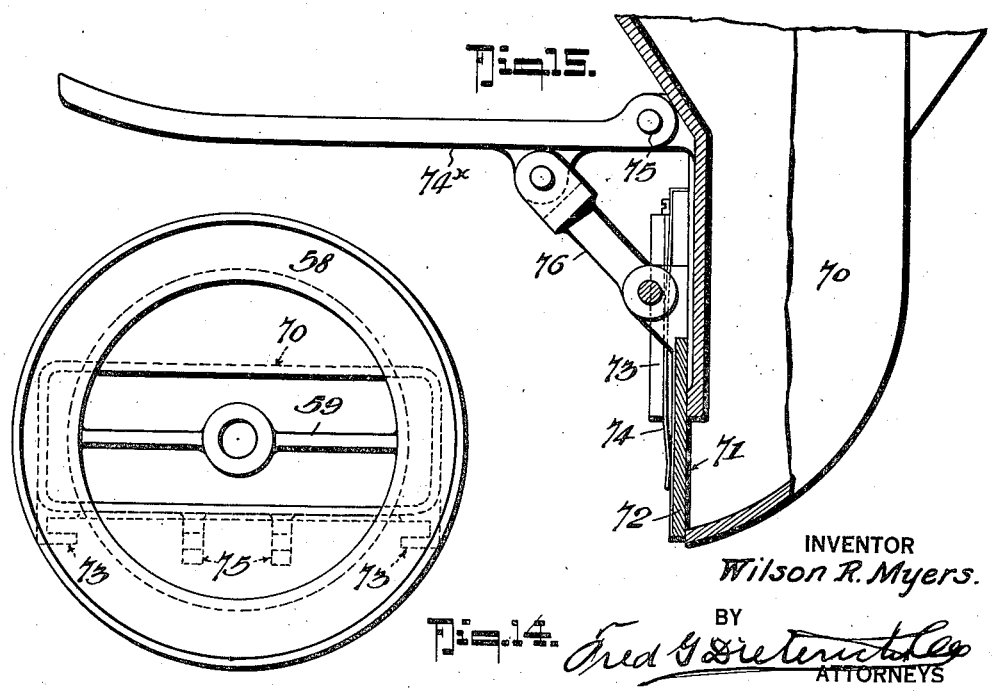

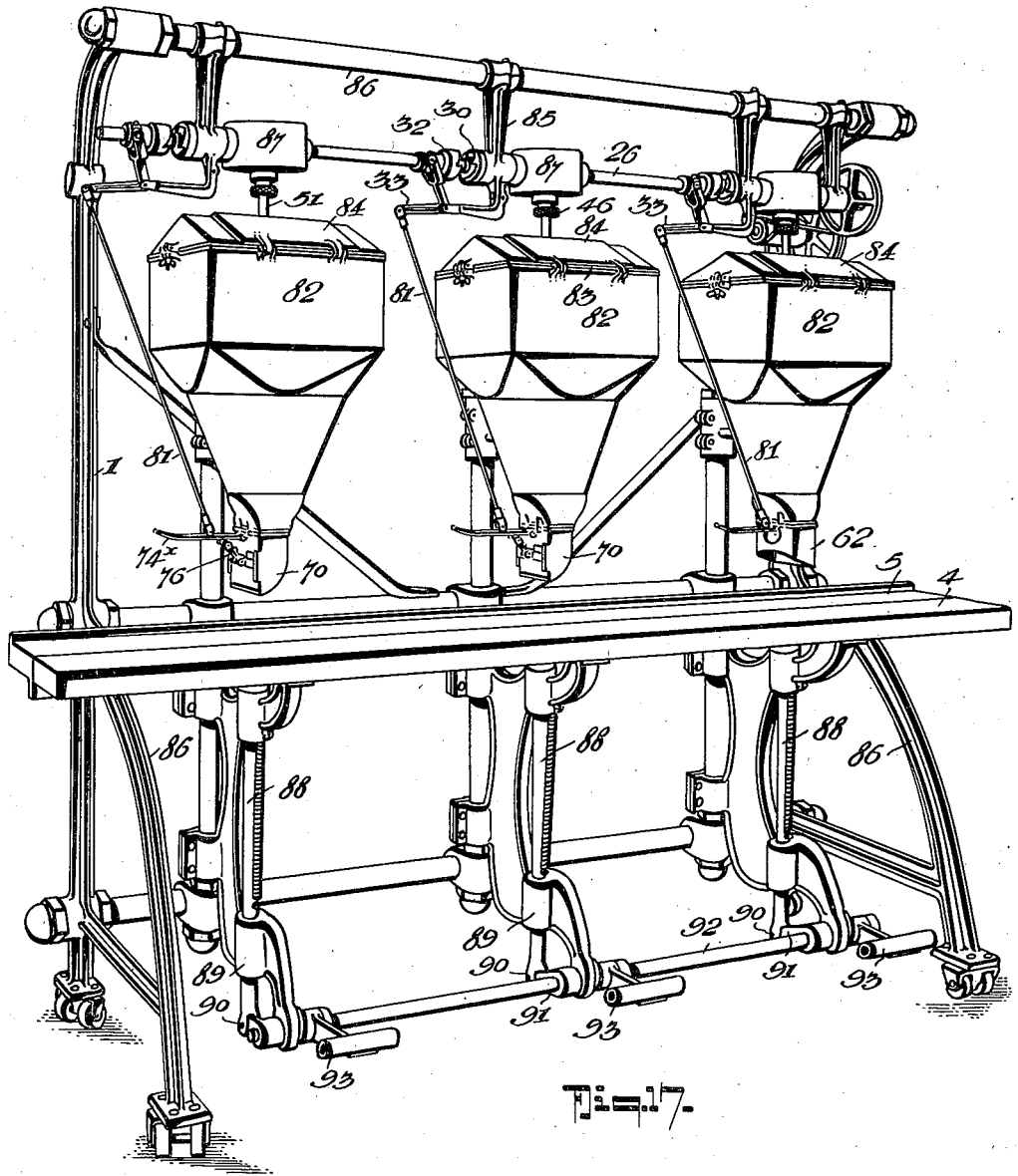
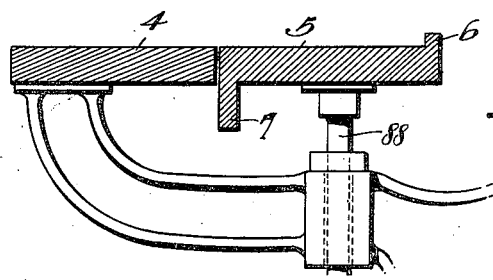

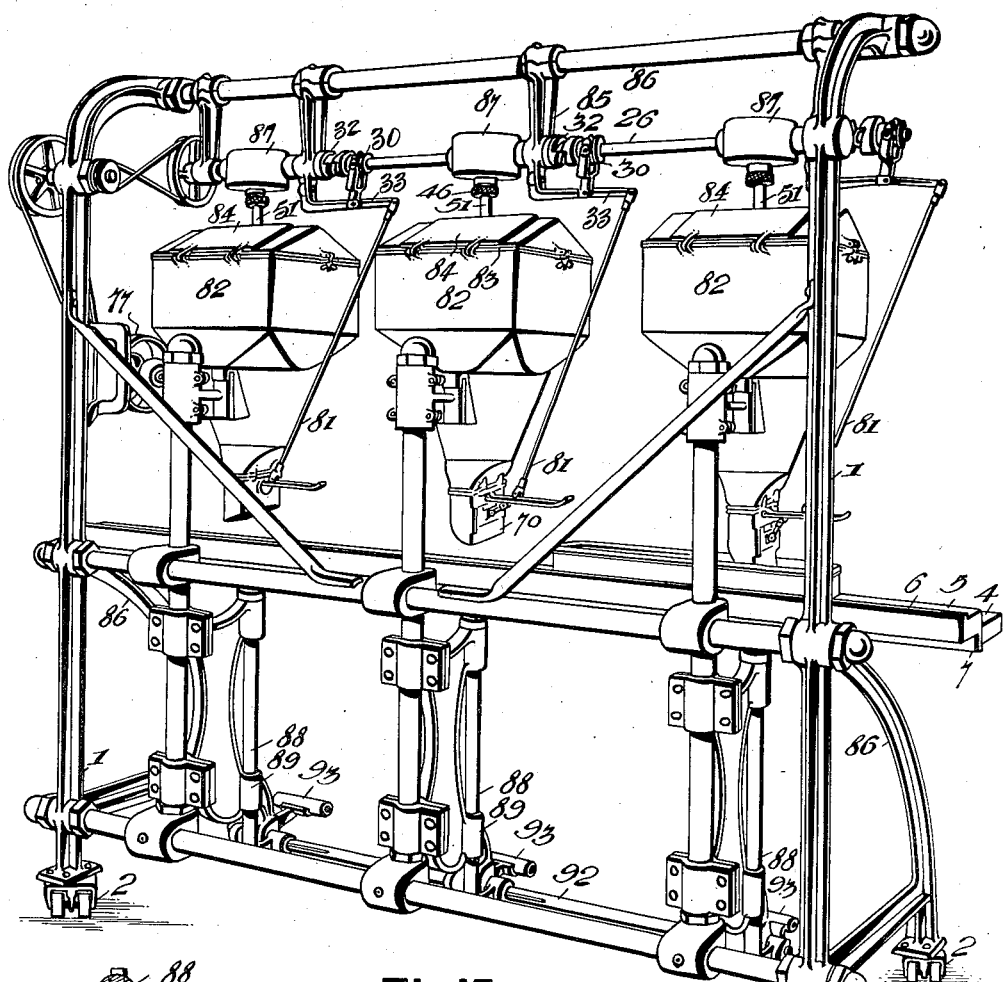

Patented Apr. 10, 1923.

1,451,431

UNITED STATES PATENT OFFICE.

WILSON R. MYERS, OF PORTLAND, OREGON, ASSIGNOR OF ONE-THIRD TO GEORGE W. BURT AND ONE-THIRD TO GEORGE W. WEATHERBY, BOTH OF PORTLAND, OREGON.

APPARTAUS FOR POSITIONING MATERIALS.

Application filed March 28, 1921, Serial No. 456,111. Renewed April 10, 1922. Serial No. 551,210.

*To all whom it may concern:*

Be it known that I, WILSON R. MYERS, a citizen of the United States residing at Portland, in the county of Multnomah and State of Oregon, have invented certain new and useful Improvements in Apparatus for Positioning Materials, of which the following is a specification.

My invention has for one of its objects to provide a convenient, sanitary, economical and practical apparatus which is especially useful for laying brick ice cream.

Heretofore in manufacturing so-called brick ice cream, it has been the general practice to make up the bricks of various colors and different flavored strata or layers. This has usually been done by the operative placing a quantity of ice cream mix in a long shallow pan by using a ladle and then taking a paddle or scraper to level out or spread the material as nearly even as possible, after which the next and succeeding layers are placed in the pan in a similar manner.

Ice cream mix, as is well known, is not frozen to a solid or non-flowing state before being placed in the molds or pans or cans in which it is shipped but is only cooled down to a few degrees below the freezing point of water. Generally the mix is brought down to between a temperature of twenty-seven and twenty-five degrees Fahrenheit, at which temperature the mix flows with sufficient freedom so that it will seek a level in the mass.

When, however, the hand method of bricking the cream is employed, the temperature must be lowered sufficiently to bring the mass into a stiffer state than is desirable and the laying of the layers by the hand method furthermore causes a compression of the mix, which not only makes the layers of variable thicknesses and the lines or "planes" of demarcation between the layers irregular but also results in the formation of ice skins between the layers, since the operator must dip his paddle into water from time to time to remove adhering cream.

Furthermore, the hand-paddle-method, by reason of the pressure necessarily applied on the cream in smoothing it down, causes the swell of the mix to be reduced by the expulsion of some of the air, thereby lowering the quantity of salable product per given amount of liquid and solid ingredients employed Again, the hand method of bricking ice cream results in considerable waste of material by slopping over and melting and further results in uncleanliness.

My invention, therefore, has for another of its objects to provide means for laying or forming the bricks of cream in such manner as will avoid the objections noted.

With other objects in view which will be apparent to those skilled in the art, the invention, in its generic nature, embodies a stand on which is mounted the necessary number of reservoirs for the various mixes to be used in forming the different layers, the reservoirs having specially designed laying nozzles or spouts to properly position the material in the molds or pans in which the materials are to lie while being hardened in the refrigerator room; a table is provided having one or more sections with provision for elevating the same a definite and determined amount, so as to locate the molds in proper position with respect to the nozzle or spouts in order to determine the location of the particular layer to be deposited in the molds, the reservoirs being provided with material feeding mechanism, adapted to be operatively connected with a source of power, either upon elevation of the table section or upon operation of the outlet valves, whereby the material may be quickly deposited in the mold in superposed layers of uniform cross section and without interference one with another, to the end, therefore, that the planes of demarcation between adjacent layers may be as nearly true planes as possible and the resultant product will be pleasing to the eye and free from ice skins.

Another object of the invention is to provide means under ready control of the attendant for operating the outlet valves in such a manner as to avoid waste of material.

Again it is an object of the invention to provide a structure by which the material will be laid in the successive layers in such manner as to prevent the material of a lower layer adhering to the sides of the mold above the place where the layer is to be laid, so that each layer of material will be completely distinct from the other layer throughout its entire mass and discoloration of upper layers by darker material of the lower layers along the sides of the brick will be avoided.

It is another object of the invention to provide a structure that can be easily sterilized and cleaned and one on which sour materials will not accumulate; the reservoirs for the materials employed may be quickly, conveniently and easily removed so that they may be immersed in boiling water and thoroughly sterilized between operations, if desired.

A further object of the invention is to provide the receptacles with specially constructed throats and valves or gates of such form and type as is best adapted to the laying of the particular layer of material which they function to form.

Other objects and advantages of the invention will hereinafter become apparent to those skilled in the art and the invention furthermore includes those novel features of construction, combination and arrangement of parts, all of which will be first fully described and then be specifically pointed out in the appended claims, reference being had to the accompanying drawings, in which:

Figure 1 is a front elevation of the preferred form of my invention.

Figure 2 is an end elevation of the same.

Figure 3 is an enlarged detail vertical cross section through the first layer hopper or reservoir, on the line 3—3 of Figure 4.

Figure 4 is a top plan view of one reservoir unit and the means by which it is attached to the frame.

Figures 5 and 6 are detail perspective views of one of the hopper supporting brackets and the fixture to which it is attached, the parts being shown separated.

Figure 7 is an enlarged detail vertical longitudinal section of one of the reservoirs showing the manner of supporting the drive gear, the main power shaft and showing the clutch mechanism and the quick detachable coupling for the feed screw shaft.

Figure 8 is an enlarged detail section showing how the screw shaft can be uncoupled from its gear drive stub shaft.

Figure 9 is an enlarged front elevation and part section of the nozzle and valve of one of the reservoirs.

Figure 10 is a side elevation and part section of the same.

Figure 11 is a horizontal section on the line 11—11 of Figure 10.

Figure 12 is an enlarged front elevation and part section of one of the nozzles for another of the reservoirs, the gate valve mechanism being removed.

Figure 13 is an end elevation and part section of the same.

Figure 14 is a top plan view of the same.

Figure 15 is an enlarged detail section and part elevation showing the gate valve in place.

Figure 16 is a detail vertical section showing one of the table raising rods and its guides.

Figure 17 is a front perspective view of a modification of the invention.

Figure 18 is a rear perspective view of the same.

Figure 19 is a detail cross section and part elevation showing the table top holding bracket and guide.

Figure 20 is a detail cross section showing one of the pedal arrangements for lifting the table top section.

Figure 21 is a detail longitudinal section of the same.

Figures 22 to 25, inclusive, are diagrammatic views showing the way the successive layers of material are laid.

Referring now to the accompanying drawings in which similar parts bear the same numbers throughout, and referring first to the preferred form of the invention disclosed in Figures 1 to 16, inclusive, it will be seen, the apparatus comprises a frame 1, preferably mounted on castors 2 for convenience in moving the apparatus about and having bracket plates 3 to which the front or stationary portion 4 of the table is fixed.

To the rear of the fixed portion of the table are the several sections 5 of that part of the table which is adapted to be raised and lowered to bring the molds (pans) into proper relation to the laying nozzles.

The raisable sections 5 of the table (there being one for each unit) each consists of a flat bed 5 whose top surface registers with that of the fixed bed 4, when the bed 5 is in the lowered position.

The bed 5 has a flange 6 along its rear edge against which the molds (pans) are guided and it has a front apron 7 to guard against the operator getting his fingers between the fixed and movable beds, when the latter are elevated.

Each bed section 5 is secured to a fixture 8 which has rods 10 and 11 passing through guide bearings in the attachment 9 which is permanently fastened to the frame 1 in any suitable manner, the rods 11 being short ones (see Figures 1 and 2), while the rod 10 is a long lift rod which projects down through a guide bearing 13, also made secure on the frame 1, and is connected, at its lower end, with the foot lever 15 that is fulcrumed on the arm 14 which projects from the bearing 13.

Adjustable collars 12 are provided on the lift rod 10 to properly position the respective table sections 5 in their lowered and elevated places.

Suitably secured to the frame 1 are a number of sets of plates 16 (they may be welded to the frame, if desired) to which the brackets 17 (see Figures 5 and 6) are fastened. The brackets 17 are arranged in pairs, rights and lefts, and have grooves 18 lying horizontally and opening at the front. At the rear are vertical recesses 19 which receive a stop bar 21 to limit the backward or inward movement of the receptacle, as it is being placed in position on the brackets.

The brackets 17 also have seats 20 for the bridge 22, which sustain the power mechanism. The bridge 22 has a cap 23 in which and in the bridge, the bearings 24 and 25 for the main power shaft 26 and clutch sleeve 27, respectively, are formed (see Figures 3, 4 and 7).

The clutch sleeve 27 carries the driving pinion 28 which is bushed to form a bearing 29 for the shaft 26 and which also has one element 30 of the clutch proper.

The sliding element 31 of the clutch is keyed to the shaft 26 but is slidable thereon to bring its clutch face 32 into and out of engagement with the clutch face 30. The sliding element 31 is shifted by a bell crank lever 33 that is fulcrumed at 34 to the bridge 22.

35 designates a clutch release spring on the shaft 26 within the sleeve 27. The sleeve 27 has a bearing fit on the sliding clutch element 31, as shown.

The bridge 22 and its cap 23 have a chamber 36 for the gears 28 and 37, the latter being splined to the stub shaft 38 which is journaled in the bearings 39 and 40, the latter being formed in a bridge extending across the chamber 36 beneath the shaft 26 and fastened at its ends between the bridge 22 and cap 23.

41 constitutes a reservoir for lubricant which may work down to oil the shaft 38 in bearing 39 and the chamber 36 may contain oil or grease to lubricate the gears 28 and 37 and the bearing surfaces 39 and 40.

The stub shaft 38 has a head 42 which is provided with a bore in which is a spring 43 and a latch ball 44 to cooperated with the grooves 47 and 48 of the collar 46 and hold it in either its up or down position, the head 42 also having a cross slot 45 to receive the cross bar or ear 49 on the head 50, which is attached to the upper end of the worm or screw shaft 51.

The parts are so arranged that, when the collar 46 is up (see Figure 8), the coupling head 50 may be slid out of connection with the head 42 and, when the heads 42 and 50 are together and the collar 46 is down (see Figure 7), the shafts 38 and 51 will be locked together.

Each reservoir unit for containing the particular mix is essentially of the same construction and consists of a top rectangular frame 52 having tongues 53 to slide in the slots 18 of the brackets 17 and having slots 54 in which the cover plates 55 are slidable.

Suitably secured to the frame 52 and projecting downwardly therefrom, is the body of the reservoir proper (see Figures 1, 3 and 7), the upper extremity 56 of which is straight, while the lower portion 57 is tapered or coniform in shape and, at its lower end, is secured in the coniform entrance 58 of the distributor or discharge nozzle or spout, the latter having a bearing spider 59 for the lower end of the feed screw shaft 51.

The shaft 51 is provided with a worm or feed screw 60, as shown.

When the apparatus is designed for laying a plurality of layers of material, the nozzle of the second and succeeding units is of the side discharge type, while that of the first unit may be of the bottom discharge type, the reason for which will later appear.

By reference to Figures 9 to 11, inclusive, the construction of the nozzle and valve for the first unit, the bottom discharge unit, will be understood.

The nozzle consists of the upper tapered entrance or mouth 58 into which the reservoir 57 is fitted, the tapered portion 61 and the straight throat 62, the latter being of rectangular cross section and having its lower end beveled-cut, as at 63, to provide a deeper rear wall than the front wall.

The front wall has an opening 64 for the valve handle or lever 65 to pass through. 66 is the flap valve which is pivoted at 67 and is held closed by a spring 68. The valve 66 is so proportioned that, when opened (see dotted lines Figure 10), its lower edge 69 will act as a levelling scraper to level the top surface of the first layer.

The reason for the bottom discharge type of nozzle on the first unit is to allow greater freedom of discharge, owing to the fact that preferably the mix in the first unit is of a thicker consistency (cooled to a lower temperature) than that of the succeeding units, since the first layer in the mold must support the weight of the layers above and by making it of a cooler, hence denser material, the liability of the bottom and next to the top layer mixing is reduced to the minimum.

The nozzles on the units which lay the second and succeeding layers are best shown in Figures 1 and 12 to 15, inclusive, by reference to which it will be observed that the throat 70 has a side opening 71 of the shape and size necessary to give form and dimensions to the ribbon of material to be laid, a sliding gate valve 72 being provided to govern the discharge of mix.

The throat 70 has guides 73 for the gate and leaf springs 74 are carried by the gate to press against the guides and keep the gate tight against the throats 70, to thereby prevent leakage. The gate 72 is raised and lowered by a lever 74$^x$ fulcrumed at 75 and linked at 76 to the gate.

The main power shaft 26 is driven by a suitable motor 77 suitably connected to the shaft by power transmitting connections and the several clutches are operated (see Figures 1 and 2) in the preferred construction, by rods 78 passing through ears 79 on the respective table sections 5 and having adjustable stops 80 so arranged as to be engaged by the ears 79 on elevation of the table section to shift the clutches into engagement, when the table sections are raised; the clutch levers may be operated by rods 81 connected to the valve operating levers of the several valves, as indicated in the modified forms shown in Figures 17 and 18.

In the preferred embodiment of the invention (Figures 1 and 2), the table sections 5 are of a length so that the molds pass over the edge of the higher section before that section is lowered, thus resting on the next succeeding section and making it easy to slide the pan or mold from one section to the other even though there may be a slight inaccuracy in the alignment of the several sections.

In using my invention, the different mixes are placed in their respective receptacles or reservoirs 57, that placed in the first reservoir being preferably cooled slightly lower than the others or the mix in the first reservoir may be the coolest, that in the second reservoir not quite so cool and that in the third reservoir of still a higher temperature, so that the first layer will be hardest, the second next and the third or top layer lightest, although, in practice, I find it is unnecessary to make any difference in the temperatures of the second and third layers.

When the mix in the first reservoir is of greater hardness than that in the remander of the reservoirs, I prefer to design the gears for the feed screw of that unit to give a faster motion to the screw and thereby exert greater feeding force on the mix, so that the volume of mix issuing from the first reservoir will issue at the same rate of flow as the volume of mix issues from succeeding reservoirs, thereby making the rate of flow from all nozzles substantially the same.

While this is preferable, it is, of course, not necessary, as the attendant can gauge the speed of movement of the mold to the particular rate of flow of the mix.

The mold pan is placed on the right hand table section 5 which is then raised by the foot lever and the pan is brought, with its left hand end, against the front of the nozzle 62, which is now projected into the pan in close proximity to the bottom thereof. The pan is pushed from right to left by the right hand of the attendant, who, at the same time, holds the lever 65 up to open the valve 66 and allow the material to issue from the nozzle into the pan (see Figure 22).

As the right hand end of the pan approaches the nozzle 62, the attendant lowers the table section 5, thereby stopping the feed screw and, at the same time, he closes the valve 66, thus shutting off the flow of material and leaving the first layer neatly and uniformly laid in the bottom of the mold pan.

The attendant then passes the pan into position beneath the nozzle of the second unit, raises the table section 5 of that unit and lays the second layer (see Figures 23 and 25) in a similar way, after which the table is again lowered and the pan moved over to the third unit to receive the third layer (see Figure 25), following which an attendant covers the pan (usually) with waxed paper and places it in the refrigerator room, where the temperature is low enough to harden the material to the desired density.

It will be seen by reference to Figures 22 to 25, inclusive, that the elevations of the pan at the different positions are such that the throats 62 and 70 of the nozzles project into the pans and by reason of the design of the same and the form and position of the outlets, no mix is spread on the sides of the molds above the level of the particular layer being laid. Thus if the three layers are of different colors, some of the mix of a lower layer will not be disposed in the plane of an upper layer to disarrange the color scheme.

The second and succeeding spouts or throats do not touch with the layer of material below, a slight clearance being provided so as to prevent mixing the two layers.

The operator gauges the speed of movement of the molds to agree to the rate of flow of the mix, thus keeping the layers of material of uniform depth.

In Figures 17 to 21, inclusive, is shown a modification of the invention, by reference to which it will be seen that the several reservoirs 82 for the mix have removable tops 83 with hinged covers 84 and the shaft 26 is sustained by overhead bearing hangers 85 carried by the frame 86.

In this form too, the gear cases 87 for the transmission gears are not supported by the brackets which sustain the reservoirs, as in the preferred form of the invention. Also, in this form, there is but one elevatable table section 5, the section 5 being sustained by rods 88 slidable in guides 89 in the frame and pivoted at 90 to the cranks 91 secured on the rock shaft 92. The different elevations of the table section 5, in this form, are attained by means of pedals 93, which are swivelled on the rock shaft, and lift fingers 94 to raise the cranks 91 until limited by stops 95. The pedal beneath the first unit raises the table for the first layer, while the second and succeeding pedals raise the table for the second and succeeding layers, respectively.

The mixes may be delivered to the reservoirs in any desired way, as by taking the cans from freezers and pouring the mixes directly into the respective reservoirs, when the covers have been opened.

When it is desired to clean the apparatus, this may be done by using an ordinary hose connected with a source of boiling water and washing out the reservoirs, while they remain in place on the frame, or the reservoirs may be removed from the frame by disconnecting the feed screw from the driving stub shaft and removing the reservoirs from their supporting brackets, after which the reservoirs may be washed and immersed in boiling water for sterilization.

The gearing and motor being above the reservoirs, any dripping material from the reservoirs will not cause any accumulation thereon and the table can be free from débris, should any occur, by simply washing it with boiling water applied by an ordinary hose or in any other convenient way.

While I have provided the reservoirs with feed screws, for thin flowing mixes, gravity alone may be depended upon to cause the discharge of material or compressed air may be introduced into the reservoirs above the mixes to aid the discharge of the same.

I prefer the use of the feed screws, however, as they aid to force the mix through the throats 62 and 70, when only a small amount of mix is contained or remains in the reservoir, whereas with gravity alone, it would be necessary to continually keep the reservoir full of mix; furthermore by using compressed air, it would require a tight lid on the reservoir which would make the operation longer and less convenient; also the feed screw being at the lower end of the reservoir, it does not agitate the entire mass of mix which, if agitated, would cause the air to be expelled from the mix, thus reducing the volume of material.

Many changes in the details of construction, design and arrangement of parts may be made without departing from the invention or the scope of the appended claims.

In so far as this application contains a disclosure of apparatus in common with that disclosed in my application Serial No. 298,248, filed May 19, 1919, this application is a continuation thereof.

I desire it understood that the word pan or mold pan in this application is not to be construed as limited to a metal pan or container of any particular material, as the material composing the pan or container forms no part of my present invention. Any material may be used in the construction of the pan or container for the bricks that is suitable for the purpose.

From the foregoing description taken in connection with the accompanying drawings, it is thought the complete construction, operation and advantages of the invention will be clear to those skilled in the art.

What I claim is:

1. In apparatus of the class described, a support, a table including a raisable element, a reservoir for the mix mounted on the support above the table and including a valved throat designed to fit within the mold into which the mix is to be deposited and shaped with its outlet opening in a direction to lay a ribbon horizontal of mix in the mold on movement of the mold horizontally, when said mold is held in place by said raisable element.

2. In apparatus of the class described, a table comprising a fixed part and an elevatable part, a plurality of reservoirs held above the table and each having a discharge throat of rectangular cross section with an outlet shaped to deliver horizontally a ribbon of material of the cross sectional shape and dimensions of the strip to be laid, said spout adapted to fit down into the mold which receives the ribbon of mix, when the table part is elevated.

3. In apparatus of the class described, a table comprising a fixed part and an elevatable part, a reservoir held above the table and having a discharge throat of rectangular cross section with an outlet shaped to deliver horizontally a ribbon of material of the cross sectional shape and dimensions of the strip to be laid, said spout adapted to fit down into the mold which receives the ribbon of mix, when the table part is elevated, and means to elevate said table part until the mold is brought with its bottom to a predetermined distance from the end of said throat.

4. In apparatus of the class described, a supporting frame, a fixed table section on the frame, at least one raisable table section paralleling the fixed section, a series of reservoirs mounted on the frame above the table and having discharge throats above the raisable section, means to raise said raisable section to bring molds placed thereon into proper relation with the reservoir throats, and control gates or valves for said reservoir throats, said reservoir throats being shaped to fit into the molds to be filled and having outlets to discharge the mix in horizontal layers one on top the other.

5. In apparatus of the class described, a plurality of reservoir units, each having throats with valve outlets at the bottom, means for supporting and raising and lowering the molds to and from said throats and including provisions for limiting the raising at the respective units to allow the mix issuing from the outlets of said units to be delivered in different horizontal planes into the molds.

6. In apparatus of the class described, a plurality of reservoir units, each having throats with valved outlets at the bottom, means for supporting the molds to be filled beneath said outlet, means causing relative movement between said mold supporting means and said reservoirs to bring the molds into operative relation with the throats of said reservoirs and including provisions for limiting said relative movement within predetermined limits to allow the mix issuing from the outlets of the several reservoir units to be delivered in different horizontal planes into the molds.

7. In apparatus of the class described, means for laying a horizontal layer of mix in the bottom of a mold pan and levelling off the same while being laid, means for laying a second layer of mix horizontally on the first layer in a preformed ribbon.

8. In apparatus of the class described, means for laying a horizontal layer of mix in the bottom of a mold pan and levelling off the same, other means for laying a second layer of mix horizontally on the first layer in a ribbon of preformed cross sectional shape and dimensions corresponding to the cross sectional form of the mold.

9. In apparatus of the class described, means for laying a layer of mix in the bottom of a mold pan and levelling the same, means for laying successively a series of superposed horizontal layers of mix on the first layer in layers of preformed cross sectional shape and dimensions.

10. In apparatus of the class described, means for first laying a layer of mix in the bottom of a mold pan and levelling the same, other means for successively laying a series of superposed layers of mix on the first layer horizontally beginning at one end of the mold and running to the other end.

11. In apparatus of the class described, means for first depositing mix in a mold pan and simultaneously levelling the same to form a layer of predetermined depth, means for forming a ribbon of mix and depositing the same on the first layer in the form of a horizontal ribbon or strip commencing at one end of the pan and extending to the other end of the same.

12. In apparatus of the class described, a series of reservoirs containing the different mixes, a table for supporting the pans to be filled, said table being adapted to allow said pans to be moved endwise in a horizontal plane beneath the reservoirs and means for bringing said reservoirs and the molds in cooperative relation whereby the mixes are deposited in said mold in superposed horizontal layers.

13. In apparatus of the class described, a frame, a series of reservoirs having throats being mounted on the frame, a series of elevatable table sections, one beneath each reservoir, said table sections being of such length that a mold pan being manipulated beneath one reservoir on one table section will project over an adjacent table section and means for lifting the said table sections to bring the mold pan into correlation with the several reservoir throats.

14. In apparatus of the class described, a frame, a series of reservoirs having throats being mounted on the frame, a series of elevatable table sections, one beneath each reservoir, said table sections being of such length that a mold pan being manipulated beneath one reservoir on one table section will project over an adjacent table section and graduated means for lifting the said table sections to bring the mold pan into correlation with the several reservoir throats.

15. In apparatus of the class described, a frame, a series of reservoirs having throats with discharge outlets and sustained on said frame, there being one reservoir for each strata of mix to be deposited, said reservoirs having their discharge outlets held in the same horizontal plane, graduated means for elevating the mold pans to the throats of the several reservoirs, whereby successive superposed layers of material will be laid in the mold pans when moved along under the respective reservoir successively, and means controlling the reservoir outlets.

16. In apparatus of the class described, a series of reservoirs having throats provided with outlets of a cross sectional form corresponding to the cross sectional form of the mold plan to be filled and of cross sectional dimensions corresponding to the cross sectional dimensions of the ribbon or layer of material to be deposited, controlling valves for said outlets, a table, means causing graduated relative movement between said table and reservoir whereby a mold pan on the table will be brought into proper position with respect to the several throats to cause the ribbons or layers of material to be laid horizontally in superposed successive distinct layers.

17. In apparatus of the class described wherein is provided a series of reservoirs having throats with valved controlled discharge outlets adapted to fit into a mold pan; a pan sustaining and guiding table comprising at least one elevatable section with means for elevating the pan to predetermined heights accordingly as the pan is to be brought into cooperative position with regard to one or another of said throats.

18. In apparatus of the class described wherein is provided a series of reservoirs having throats with valved controlled discharge outlets adapted to fit into a mold pan; a pan sustaining and guiding table comprising at least one elevatable section with means for elevating the pan to predetermined heights accordingly as the pan is to be brought into cooperative position with regard to one or another of said throats, and a fixed table section adjacent to the elevatable section with which the elevatable section is designed to lie flush when lowered, said elevatable section having a guard apron adjacent to the fixed table section.

19. In apparatus of the class described, a support, a reservoir on said support having a throat provided with a valved controlled outlet, said throat shaped to fit into a mold pan, means for raising a mold pan up to and lowering it out of cooperation with said throat, and means distinct from said throat for positively limiting the raising movement of the pan.

20. In apparatus of the class described, a support, a reservoir on said support having a throat provided with a valved controlled outlet, said throat shaped to fit into a mold pan, means for raising a mold pan up to and lowering it out of cooperation with said throat and means distinct from said throat for positively limiting the raising movement of the pan, a feed screw in said reservoir, a power shaft, clutch and gear power transmitting connections between said shaft and screw, and means for throwing in the clutch when the pan is in position.

21. In apparatus of the class described, a support, a reservoir on said support having a throat provided with a valved controlled outlet, said throat adapted to fit into a mold pan, means for raising a mold pan up to and lowering it into and out of cooperation with said throat, a feed screw in said reservoir, a power shaft, clutch and gear power transmitting connections between said shaft and screw, and means for throwing in the clutch when the pan is in position, said clutch throwing means including devices for operating the clutch to the engaging position on elevation of the pan.

22. In apparatus of the class described, a support, a reservoir on said support having a throat provided with a valved controlled outlet, said throat adapted to fit into a mold pan, means for raising a mold pan up to and lowering it into and out of co-operation with said throat and means positively limiting the raising movement of the pan, a feed screw in said reservoir, a power shaft, clutch and gear power transmitting connections between said shaft and screw, and means for throwing in the clutch when the pan is in position, said clutch throwing means including devices for operating the clutch to the engaging position on elevation of the pan.

23. In apparatus of the class described, a support, brackets on said support, a reservoir unit horizontally slidably mounted on said brackets, a power shaft carried in bearings above said brackets, a feed screw in the reservoir, and power transmitting connections between said shaft and screw including a releasable coupling, said reservoir having a discharge throat.

24. In apparatus of the class described, a support, brackets on said support, a reservoir unit horizontally slidably mounted on said brackets, a power shaft carried in bearings above said brackets, a feed screw in the reservoir, power transmitting connections between said shaft and screw including a releasable coupling, said reservoir having a discharge throat, a table beneath said throat having a raisable element, and means to raise and lower said element to bring said throat into and out of a mold pan sustained on the table.

25. In apparatus of the class described, a support, brackets on said support, a reservoir unit horizontally slidably mounted on said brackets, a power shaft carried in bearings above said brackets, a feed screw in the reservoir, power transmitting connections between said shaft and screw including a releasable coupling, said reservoir having a discharge throat, a table beneath said throat having a raisable element, means to raise and lower said element to bring said throat into and out of a mold pan sustained on the table, said power transmitting connections including a clutch, means for holding said clutch normally released and means for throwing said clutch into engagement when the mold is being filled.

26. In apparatus of the class described, a support, brackets on said support, a reservoir unit horizontally slidably mounted on said brackets, a power shaft carried in bearings above said brackets, a feed screw in the reservoir, power transmitting connections between said shaft and screw including a releasable coupling, said reservoir having a discharge throat, a table beneath said throat having a raisable element, means to raise and lower said element to bring said throat into and out of a mold pan sustained on the table, said power transmitting connections including a clutch, means for holding said clutch normally released, and means operated by the table element for moving said clutch to the engaged position.

27. In apparatus of the class described, a reservoir unit comprising a containing body, a supporting band secured around the top of said body and having inner horizontal cover slide grooves, cover elements held in said grooves, said band having external flanges, sustained brackets with grooves for said flanges, means holding said brackets in fixed position, said means including a bridge connected to the brackets and passing over the reservoir, said bridge having bearings, a power shaft and a driven shaft journalled in said bearings and power transmitting connections between said shafts, a feed screw in the reservoir, and a coupling between the driven shaft and feed screw, said reservoir having a discharge throat.

28. In apparatus of the class described, a reservoir unit comprising a containing body, a pair of supporting brackets for said body, a bridge connected to the brackets and passing over the reservoir and having bearings, a power shaft and a driven shaft journalled in said bearings and power transmitting connections between said shafts, a feed screw in the reservoir, said reservoir having a discharge throat beneath the feed screw, and a valve for controlling the discharge of material through said throat.

29. In apparatus of the class described, a reservoir unit comprising a containing body, a pair of supporting brackets for said body, a bridge connected to the brackets and passing over the reservoir and having bearings, a power shaft and a driven shaft journalled in said bearings and power transmitting connections between said shafts, a feed screw in the reservoir, said reservoir having a discharge throat beneath the feed screw, a valve for controlling the discharge of material through said throat, said power transmitting connections including a clutch having a shiftable element and means sustained by said bridge for shifting said shiftable element.

30. In apparatus of the class described, a reservoir comprising a top section with substantially vertical walls, an intermediate section having downwardly converging walls and a spout with which said downwardly converging walls connect at the bottom, said spout including a rectangular throat having vertical walls adapted to fit into a mold pan of rectangular cross section and having a discharge opening in one side wall shaped to deliver a rectangular strip or ribbon of material from the reservoir in a horizontal direction.

31. In apparatus of the class described, a reservoir comprising a top section with substantially vertical walls, an intermediate section having downwardly converging walls and a spout with which said downwardly converging walls connect at the bottom, said spout including a rectangular throat having vertical walls adapted to fit into a mold pan of rectangular cross section and having a discharge opening in one side wall shaped to deliver a rectangular strip or ribbon of material from the reservoir in a horizontal direction, and a sliding gate valve mounted on the throat to control said opening.

32. In apparatus of the class described, wherein is provided a reservoir for ice cream mix; a discharge spout therefor comprising a receiving end and a discharge throat, the latter consisting of a rectangular-in-cross section duct having a discharge opening at its bottom shaped to deliver horizontally a strip of material in a flat ribbon form and a valve for controlling said opening.

33. In apparatus of the class described wherein is provided a reservoir for ice cream mix; a discharge spout therefor comprising a receiving end and a discharge throat, the latter consisting of a rectangular-in-cross section duct having a discharge opening at its bottom shaped to deliver a strip of material in a flat ribbon form, a valve for controlling said opening, said valve comprising a swinging gate within the duct, said duct having its bottom bevelled, said gate being pivoted against the shortest wall of the duct and adapted to be swung flatwise against the same with its bottom edge below the bottom edge of said wall, when the gate is open, to constitute a levelling device, and a handle for opening said gate.

34. In apparatus of the class described, a pair of supporting brackets, a reservoir supported between and by the same, a bridge mounted on the brackets over the reservoir and including bearing elements and a cap having corresponding bearing elements, a drive shaft and clutch journaled in said bearing elements, said bridge having another bearing, a driven shaft held in said other bearing, said clutch comprising a slidable element keyed to the shaft and a relatively fixed element journaled in one of said bridge and cap bearings and having a gear provided with a bearing surface for said power shaft, a gear on said driven shaft meshing with said clutch gear and means for shifting said sliding clutch element.

35. In apparatus of the class described, a pair of supporting brackets, a reservoir supported between and by the same, a bridge mounted on the brackets over the reservoir and including bearing elements and a cap having corresponding bearing elements, a drive shaft and clutch journaled in said bearing elements, said bridge having another bearing, a driven shaft held in said other bearing, said clutch comprising a slidable element keyed to the shaft and a relatively fixed element journaled in one of said bridge and cap bearings and having a gear provided with a bearing surface for said power shaft, a gear on said driven shaft meshing with said clutch gear, means for shifting said sliding clutch element, said means comprising a spring between the fixed and shiftable clutch elements and a lever for shifting said shiftable clutch element against the spring action.

36. In apparatus of the class described, a pair of supporting brackets, a reservoir supported between and by the same, a bridge mounted on the brackets over the reservoir and including bearing elements and a cap having corresponding bearing elements, a drive shaft and clutch journalled in said bearing elements, said bridge having another bearing, a driven shaft held in said other bearing, said clutch comprising a slidable element keyed to the shaft and a relatively fixed element journaled in one of said bridge and cap bearings and having a gear provided with a bearing surface for said power shaft, a gear on said driven shaft meshing with said clutch gear, means for shifting said sliding clutch element, said means comprising a spring between the fixed and shiftable clutch elements, a lever for shifting said shiftable clutch element against the spring action, said driven shaft comprising a stub shaft and a shaft extending therefrom into said reservoir, and a releasable coupling between said stub shaft and said last named shaft.

37. In apparatus of the class described, a pair of supporting brackets, a reservoir supported between and by the same, a bridge mounted on the brackets over the reservoir and including bearing elements and a cap having corresponding bearing elements, a drive shaft and clutch journaled in said bearing elements, said bridge having another bearing, a driven shaft held in said other bearing, said clutch comprising a slidable element keyed to the shaft and a relatively fixed element journaled in one of said bridge and cap bearings and having a gear provided with a bearing surface for said power shaft, a gear on said driven shaft meshing with said clutch gear, means for shifting said sliding clutch element, said means comprising a spring between the fixed and shiftable clutch elements, a lever for shifting said shiftable clutch element against the spring action, said driven shaft comprising a stub shaft and a shaft extending therefrom into said reservoir, a releasable coupling between said stub shaft and said last named shaft, said reservoir being slidably mounted on said brackets for removal and replacement and said coupling having interlocking parts adapted for disconnecting and connecting the shafts on removal and replacement, respectively, of said reservoir.

38. In apparatus of the class described, a pair of supporting brackets, a reservoir supported between and by the same, a bridge mounted on the brackets over the reservoir and including bearing elements and a cap having corresponding bearing elements, a drive shaft and clutch journaled in said bearing elements, said bridge having another bearing, a driven shaft held in said other bearing, said clutch comprising a slidable element keyed to the shaft and a relatively fixed element journaled in one of said bridge and cap bearings and having a gear provided with a bearing surface for said power shaft, a gear on said driven shaft meshing with said clutch gear, means for shifting said sliding clutch element, and a bridge bearing member secured at its ends between said bridge and cap and extending under said power shaft and having a bearing for said driven shaft.

39. In apparatus of the class described, a plurality of reservoirs for the materials employed arranged seriatim, a mold receiving table beneath the reservoirs along which the molds may be slid endwise in succession below the reservoirs, said reservoirs having throats to fit into the mold and having outlets to discharge the contents into the molds, and means causing relative motion between the reservoirs and molds to position the molds and reservoirs into cooperative relation when a mold is placed on the table beneath a reservoir, all being arranged whereby as a mold is slid along the table and brought into position with respect to the several reservoirs successively, successive superposed layers of material will be deposited into the molds.

40. In apparatus of the class described, a plurality of reservoirs for the materials employed, means for sustaining the said reservoirs in seriatim arrangement, a mold receiving table beneath the reservoirs along which the molds may be slid endwise in succession below the reservoirs, said reservoirs having discharge throats arranged with their outlets to deliver the contents of the reservoirs into the molds, and cutoff valves controlling the discharge of the materials, all being arranged whereby as the mold is slid along the table and brought into position with respect to the several reservoirs successively, successive superposed layers of material may be deposited into the molds.

41. In apparatus of the class described, a table comprising a fixed part and an elevatable part, said parts adapted to register when the elevatable part is in normal position, a reservoir held above the table and having a discharge throat of rectangular cross section with an outlet shaped to deliver horizontally a continuous ribbon of material of the cross sectional shape and dimensions of the strip to be laid, said spout adapted to fit down into the mold which receives the ribbon of mix when the table part is elevated, means to control the flowing mix as it passes through said throat and means for elevating said table part until the mold is brought with its bottom spaced a predetermined distance from the end of the said throat.

WILSON R. MYERS.